(12) United States Patent
Kim et al.

(10) Patent No.: US 7,802,273 B2
(45) Date of Patent: Sep. 21, 2010

(54) TURNTABLE ASSEMBLY

(75) Inventors: Nam Seok Kim, Gyeonggi-do (KR);
 Kyung Seob Shin, Gyeonggi-do (KR);
 Young Sun Yoo, Gyeonggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 545 days.

(21) Appl. No.: 11/635,544

(22) Filed: Dec. 8, 2006

(65) Prior Publication Data

US 2007/0300247 A1 Dec. 27, 2007

(30) Foreign Application Priority Data

Jun. 27, 2006 (KR) ...................... 10-2006-0058179

(51) Int. Cl.
 *G11B 17/028* (2006.01)
(52) U.S. Cl. ...................................... 720/709; 720/707
(58) Field of Classification Search ................ 720/706, 720/707, 708, 711, 712, 714, 709
 See application file for complete search history.

(56) References Cited

U.S. PATENT DOCUMENTS

| 6,041,033 | A * | 3/2000 | Otsubo et al. ................ 720/707 |
| 6,208,613 | B1 * | 3/2001 | Iizuka ........................ 720/707 |
| 6,363,048 | B1 * | 3/2002 | Wu et al. ..................... 720/707 |
| 6,829,777 | B2 * | 12/2004 | Tokumitsu .................... 720/717 |
| 7,191,458 | B2 * | 3/2007 | Tokumitsu .................... 720/717 |
| 2004/0216154 | A1 * | 10/2004 | Kim et al. ................... 720/707 |
| 2006/0031867 | A1 * | 2/2006 | Ikemoto ...................... 720/707 |
| 2006/0048176 | A1 * | 3/2006 | Choi et al. ................... 720/707 |

FOREIGN PATENT DOCUMENTS

| JP | 04119553 | A | * | 4/1992 |
| JP | 08190752 | A | * | 7/1996 |
| JP | 08190754 | A | * | 7/1996 |
| JP | 08335351 | A | * | 12/1996 |
| JP | 10-21641 |  |  | 1/1998 |
| JP | 10188418 | A | * | 7/1998 |
| JP | 11066788 | A | * | 3/1999 |
| JP | 2000067497 | A | * | 3/2000 |
| JP | 2003006967 | A | * | 1/2003 |
| KR | 20-0153823 |  |  | 10/1997 |

OTHER PUBLICATIONS

Office Action issued in Korean Patent Application No. 012974286.
Office Action mailed on Jun. 3, 2008 and issued in corresponding Japanese Patent Application No. 2006-347167.

* cited by examiner

*Primary Examiner*—William J Klimowicz

(57) ABSTRACT

Disclosed herein is a turntable assembly. The turntable assembly includes a turntable for mounting the optical disk thereon, and a chucking member which is contracted toward a center of an optical disk and holds the optical disk. A spring elastically biases the chucking member in a direction away from the center of the optical disk. An elastic support member supports the chucking member in a direction opposite an inserting direction, so that at least part of the elastic support member supporting the chucking member is elastically deformed in the inserting direction of the optical disk. A housing accommodates the chucking member, the spring, and the elastic support member therein. The elastic support member includes a support part which is spaced apart from the turntable to undergo elastic deformation in the inserting direction, and supports the chucking member.

14 Claims, 5 Drawing Sheets

TURNTABLE ASSEMBLY

CROSS REFERENCE TO RELATED APPLICATION(S)

This application claims the benefit of Korean Patent Application No. 10-2006-0058179, filed Jun. 27, 2006, entitled "Turntable assembly", which is hereby incorporated by reference in its entirety into this application.

BACKGROUND OF THE INVENTION

1. Field of the Invention

The present invention generally relates to a turntable assembly for mounting an optical disk and, more particularly, to a turntable assembly, allowing easy mounting and removal of an optical disk.

2. Description of the Related Art

Generally, a spindle motor for rotating an optical recording medium, such as an optical disk or a hard disk, at high speeds, rotatably supports a rotating shaft using an oil film formed between a bearing and the rotating shaft from a lubricant, thus maintaining rotating characteristics having nigh precision. Tnerefore, the spindle motor is widely used as a driving means for a recording medium, including a hard disk drive and an optical disk drive, and other recording media requiring high-speed rotation.

In such a spindle motor, one important consideration is the prevention of slippage or removal of the optical recording medium while the spindle motor is rotating at high speeds. Further, even when the optical recording medium is mounted/removed, the optical recording medium must not be damaged, and thus an excessively large force must not be required. One example of a turntable assembly for mounting/removing the optical disk, which satisfies the above-mentioned requirements, is schematically shown in FIG. 4.

As shown in FIG. 4, a conventional turntable assembly 300 includes a turntable 310, a chucking member 320, and a spring 330.

The turntable 310 serves to support an optical disk 150, and includes a support plate 311 and a housing 315.

The support plate 311 is the part on which the optical disk 150 is seated. An anti-slip rubber ring 314 is attached to the support plate 311 to prevent the slippage of the optical disk 150 when a spindle motor rotates at high speeds.

The chucking member 320 and the spring 330 are installed in the housing 315. The housing 315 is inserted into a central hole 151 of the optical disk 150 seated on the support plate 311.

The chucking member 320 is a member for holding the optical disk 150. One end of the chucking member 320 protrudes outwards, and the other end of the chucking member 320 is inserted into the housing 315. The chucking member 320 contracts and slides in the housing 315.

The spring 330 is an elastic member for elastically biasing the chucking member 320 outwards in a radial direction, and is installed in the housing 315.

FIGS. 5A to 5C are sectional views showing the example in which the optical disk 150 is mounted on the turntable assembly 300 of FIG. 4.

Before the optical disk 150 is mounted on the turntable assembly 300, the chucking member 320 is elastically biased by the spring 330, so that the chucking member 320 protrudes out of the housing 315 (FIG. 5A).

Next, the optical disk 150 is mounted while pressing the chucking member 320. At this time, the chucking member 320 is contracted into the housing 315 using the mounting force of the optical disk 150 (FIG. 5B).

Finally, the optical disk 150 engages with the lower contact surface of the chucking member 320, completing the operation of mounting the optical disk 150 (FIG. 5C).

However, in the conventional turntable assembly 300 constructed as described above, when the optical disk 150 is mounted, the optical disk 150 is almost parallel with the chucking member 320, so that the mounting force of the optical disk 150 is not efficiently transmitted to the chucking member 320. Thus, in order to push the chucking member 320 into the housing 315, excessive force must be applied to the optical disk 150. Thereby, the portion of the optical disk 150 contacting the chucking member 320 may be damaged.

SUMMARY OF THE INVENTION

Accordingly, the present invention has been made keeping in mind the above problems occurring in the prior art, and an object of the present invention is to provide a turntable assembly, which inclines a chucking member at a predetermined angle when an optical disk is mounted, thus allowing the mounting force of the optical disk to be more efficiently transmitted to the chucking member, therefore allowing the optical disk to be easily mounted or removed without applying excessive force to the optical disk.

In order to accomplish the above object, the present invention provides a turntable assembly, including a holding member which is contracted in a radial direction of an optical disk and holds the optical disk, and a support member supporting the holding member in a direction opposite an inserting direction, so that at least part of the support member supporting the holding member is elastically deformed in the inserting direction of the optical disk.

The support member has predetermined displacement in the inserting direction of the optical disk.

The turntable assembly further includes an elastic member for elastically biasing the holding member in a direction opposite the radial direction.

The present invention provides a turntable assembly, including a chucking member which is contracted toward a center of an optical disk and holds the optical disk, a spring for elastically biasing the chucking member in a direction away from the center of the optical disk, an elastic support member supporting the chucking member in a direction opposite an inserting direction, so that at least part of the elastic support member supporting the chucking member is elastically deformed in the inserting direction of the optical disk, and a housing accommodating the chucking member, the spring, and the elastic support member therein.

The turntable assembly further includes a turntable for mounting the optical disk thereon, the housing being installed at a center of the turntable so that the chucking member contacts an inner circumferential surface of the optical disk.

In this case, the elastic support member includes a mounting part mounted to be secured to the turntable, and a support part spaced apart from the turntable to undergo elastic deformation in the inserting direction, and supporting the chucking member.

Further, a surface of the support part contacting the chucking member is inclined relative to a lower portion of the chucking member at an angle of 17 degrees.

The chucking member is inclined in the inserting direction due to the elastic deformation of the support part when the optical disk is inserted.

Further, a plurality of chucking members and a plurality of springs are installed around a center of the housing at regular intervals.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Hereinafter, a turntable assembly 100, according to the preferred embodiment of the present invention, will be described in detail with reference to the accompanying drawings.

Figure 1:
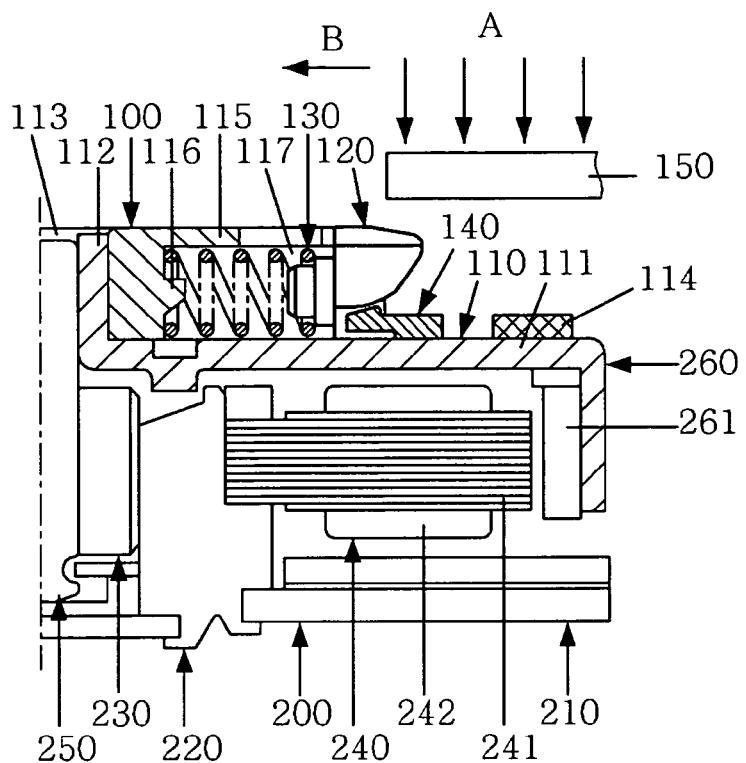
FIG. 1 is a schematic sectional view showing a spindle motor equipped with a turntable assembly, according to the preferred embodiment of the present invention.

As shown in FIG. 1, a turntable assembly 100 according to the preferred embodiment of the present invention is integrated with a spindle motor 200, and prevents the removal of an optical disk 150 when the spindle motor 200 is rotated at high speeds.

The spindle motor 200 functions to rotate and drive the optical disk 150 mounted on the spindle motor 200. The spindle motor 200 includes a base 210, a bearing holder 220, a bearing 230, an armature 240, a rotating shaft 250, and a rotor casing 260.

The base 210 supports the entire spindle motor 200, and is securely mounted on a device, such as a hard disk drive, at which the spindle motor 200 is installed. The bearing holder 220 functions to securely support the bearing 230, and has the shape of a hollow cylinder. One end of the bearing holder 220 is sealed with caulking, so that the bearing holder 220 is secured to the base 210. The bearing 230 rotatably holds the rotating shaft 250, and is installed such that the central axis of the bearing 230 is aligned with the central axis of the rotating shaft 250. The armature 240 forms an electric field when external power is applied to the armature 240, and includes a core 241 and a coil 242 wound around the core 241. The coil 242 forms an electric field when electric power is supplied from the exterior, thus rotating the rotor casing 260.

The rotating shaft 250 is rotatably inserted into the bearing 230, and supports the rotor casing 260 upwards. A magnet 261, which faces the armature 240 and generates rotating force, is secured to the inner wall of the rotor casing 260. Further, the turntable assembly 100 is provided on the upper portion of the rotor casing 260 to support the optical disk 150.

In this case, when external power is applied to the armature 240, the rotor casing 260 is rotated by force generated between the coil 242 and the magnet 261.

Figure 2:
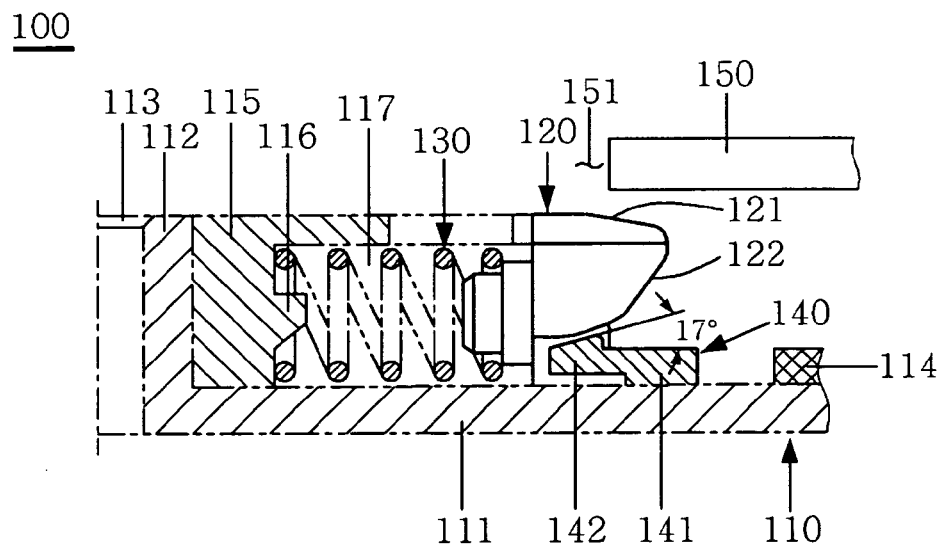
FIG. 2 is an enlarged sectional view showing part of the turntable assembly of FIG. 1.

As shown in FIG. 2, the turntable assembly 100 of the present invention includes a turntable 110, a chucking member 120, a spring 130, and an elastic support member 140. The turntable assembly 100 is integrated with the spindle motor 200.

The turntable 110 functions to support the optical disk 150. According to this embodiment, the rotor casing 260 of the spindle motor 200 is used as the turntable 110. The turntable 110 is provided with a support plate 111 and a housing 115.

The support plate 111 denotes the upper surface of the rotor casing 260, and is the part on which the optical disk 150 is seated. A coupling holder 112 is provided on the support plate 111 so that the rotating shaft 250 can be inserted into and coupled to the coupling holder 112.

The coupling holder 112 protrudes upwards from the central portion of the support plate 111. A coupling hole 113 having the same diameter as the rotating shaft 250 is formed in the coupling holder 112, so that the rotating shaft 250 is secured to the coupling holder 112. In this case, the rotating shaft 250 may be press-fitted into the coupling hole 113. Alternatively, the rotating shaft 250 may be secured in the coupling hole 113 using a predetermined adhesive means.

Further, an anti-slip rubber ring 114 is attached along the outer circumference of the support plate 111, and prevents the slippage of the optical disk 150 when the spindle motor 200 is rotated at high speeds.

The housing 115 completely surrounds the coupling holder 112, and protrudes from the central portion of the support plate 111 to be inserted into a central hole 151 of an optical disk 150.

Further, the chucking member 120 and the spring 130 are installed in the housing 115 to secure the optical disk 150 which is seated on the support plate 111. In this case, the housing 115 is provided with a locking protrusion 116 which is inserted into one end of the spring 130 to lock the spring 130. A plurality of openings 117 is formed in the housing 115 in such a way as to open to one side of the housing 115, so that the chucking member 120 slides in the housing 115.

The plurality of openings 117 is formed around the center of the housing 115 at regular intervals, thus allowing a plurality of chucking members 120 and springs 130 to be installed in the housing 115.

Each chucking member 120 is the member that holds the optical disk 150. One end of the chucking member 120 protrudes outwards, while the other end of the chucking member 120 is inserted into each opening 117 of the housing 115, so that the chucking member 120 contracts and slides into the opening 117. In this case, one end of each chucking member 120 is inserted into one end of the corresponding spring 130, so that the chucking member 120 is elastically biased by the spring 130.

Further, the outward protruding portion of each chucking member 120, which contacts the optical disk 150, is inclined such that each of an upper contact surface 121 and a lower contact surface 122 has a predetermined inclination angle. In this case, the inclination angle of the upper contact surface 121 is smaller than that of the lower contact surface 122, thus allowing easy removal of the optical disk 150.

Each spring 130 is the elastic member for elastically biasing the corresponding chucking member 120 towards the outer portion in a radial direction, more particularly, in a direction opposite the central direction B of the optical disk 150. The spring 130 is installed in the housing 115, and is locked at one end thereof to the locking protrusion 116 and is locked at the other end thereof to the end of the chucking member 120. Preferably, the diameter of the spring 130 is slightly smaller than that of the end of the chucking member 120.

The elastic support member 140 functions to support each chucking member 120 in a direction opposite the radial direction. The elastic support member 140 supports the lower portion of the chucking member 120 to prevent the chucking member 120, which is elastically biased by each spring 130, from being dislodged out of the housing 115. The elastic support member 140 is mounted on the upper surface of the support plate 111 to contact the lower contact surface 122 of the chucking member 120.

Further, the elastic support member 140 preferably has elasticity so that the chucking member 120 is inclined at a predetermined angle when the optical disk 150 is mounted.

According to the preferred embodiment of the present invention, the elastic support member 140 includes a mounting part 141 and a support part 142. The mounting part 141 is mounted on the support plate 111 of the turntable 110. The support part 142 extends integrally from the mounting part 141, contacts the lower contact surface 122 of the chucking member 120, and is bent by the mounting force of the optical disk 150 and thus undergoes elastic deformation.

In this case, the portion of the support part 142 contacting the lower contact surface 122 is inclined to correspond to the inclination angle of the lower contact surface 122. According to this embodiment, the support part 142 is preferably inclined at an angle of 17 degrees.

Further, it is preferable that the lower surface of the support part 142 be spaced apart from the support plate 111 by a predetermined interval, thus allowing the support part 142 to be easily bent by the mounting force.

FIGS. 3A to 3D are sectional views showing the example where the optical disk 150 is mounted to the turntable assembly 100 of FIG. 2. The process of mounting the optical disk 150 to the turntable assembly 100 will be described with reference to the drawings.

Figure 3A:
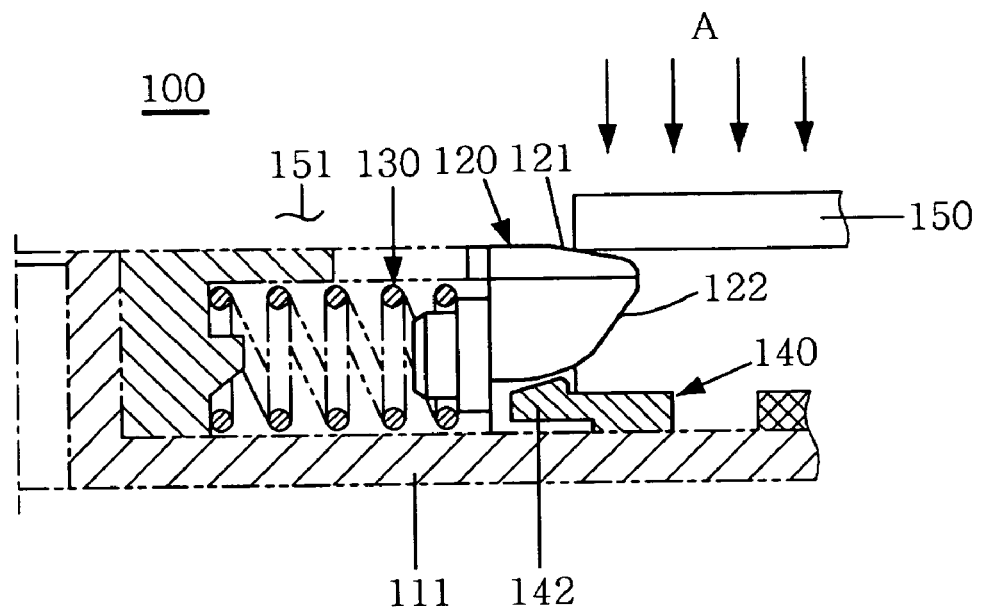
FIGS. 3A to 3D are schematic views showing the state where an optical disk is coupled to the turntable assembly of FIG. 2.

Before the optical disk 150 is mounted to the turntable assembly 100, the upper and lower contact surfaces 121 and 122 of each chucking member 120 are protruded out of the housing 115 by the corresponding spring 130. The lower contact surface 122 is supported by the support part 142 of the elastic support member 140 coupled to the support plate 111 (FIG. 3A).

Figure 3B:
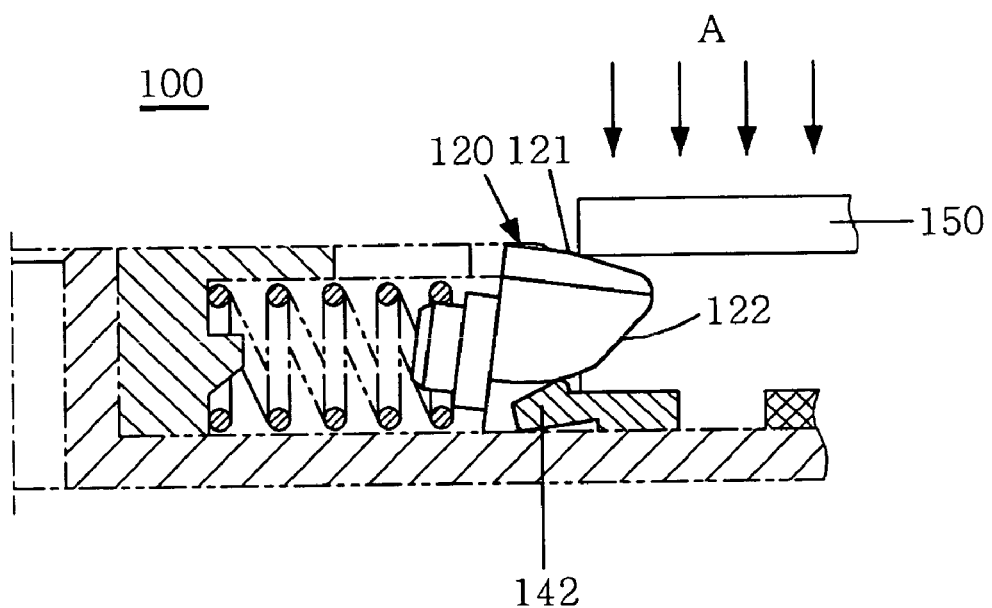

Next, the optical disk 150 is mounted while the upper contact surface 121 of each chucking member 120 is pushed in an inserting direction A. At this time, the support part 142 of the elastic support member 140 is bent in the inserting direction A by the mounting force of the optical disk 150, so that each chucking member 120 is inclined, and thus the mounting force of the optical disk 150 can be more smoothly transmitted to the chucking member 120 (FIG. 3B).

Figure 3C:
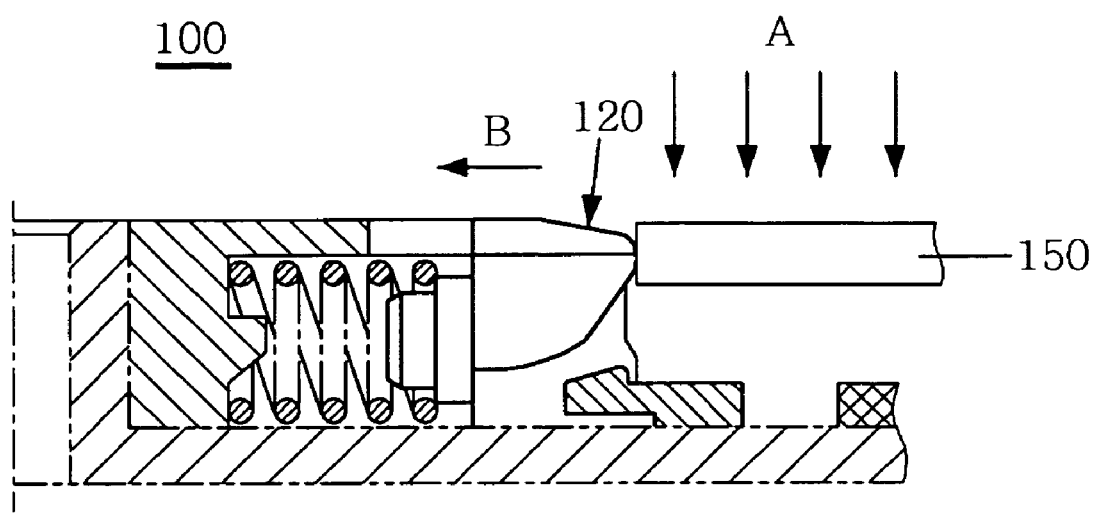

Afterwards, due to the mounting force of the optical disk 150, each chucking member 120 is contracted into the housing 115 near the center B of the optical disk 150. When the optical disk 150 contacts the outermost end of each chucking member 120, the chucking member 120 is thrust into the innermost portion of the housing 115 (FIG. 3C).

Figure 3D:
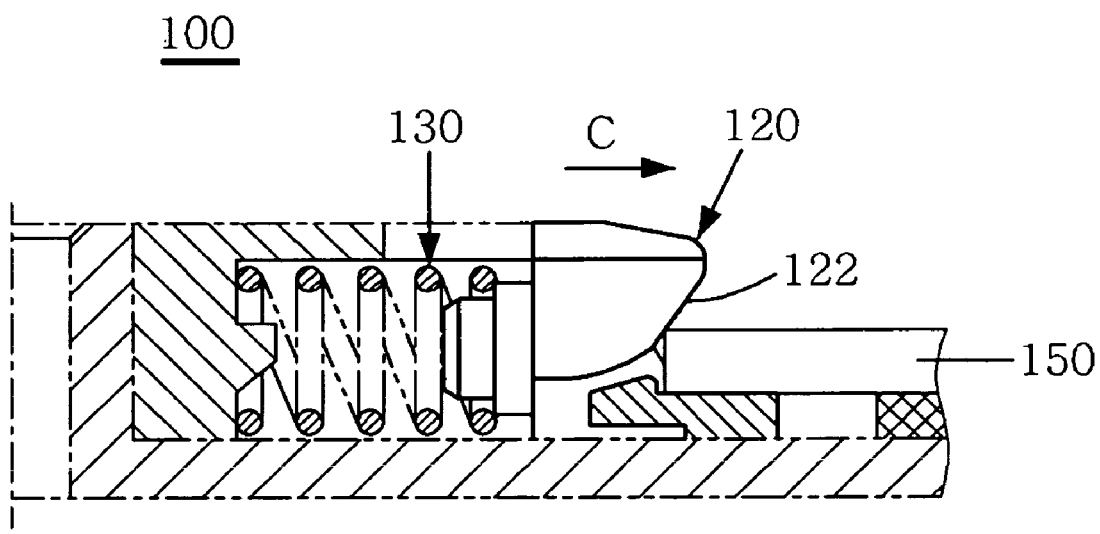
Figure 4:
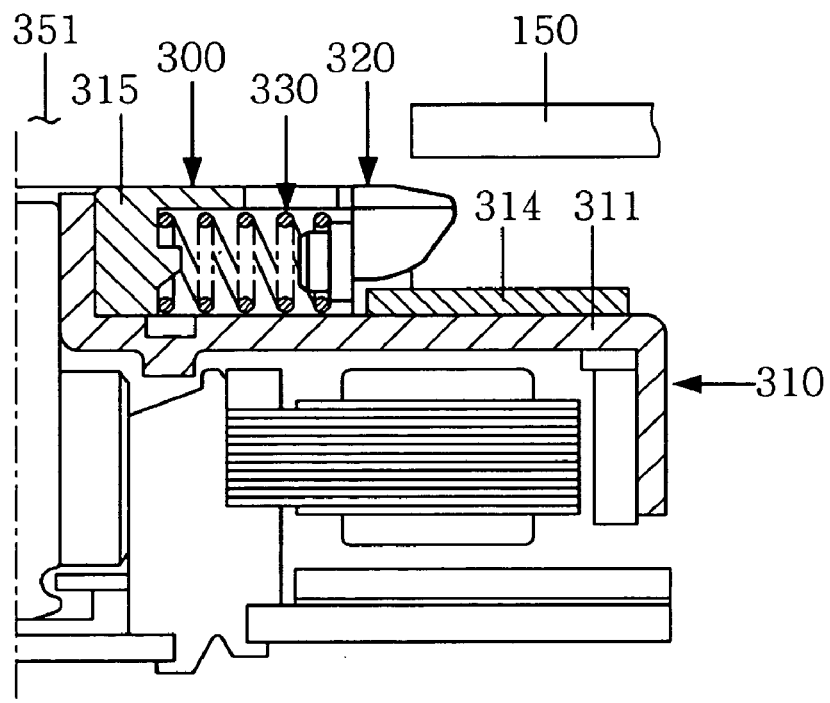
FIG. 4 is a sectional view showing a conventional turntable assembly.
Figure 5A:
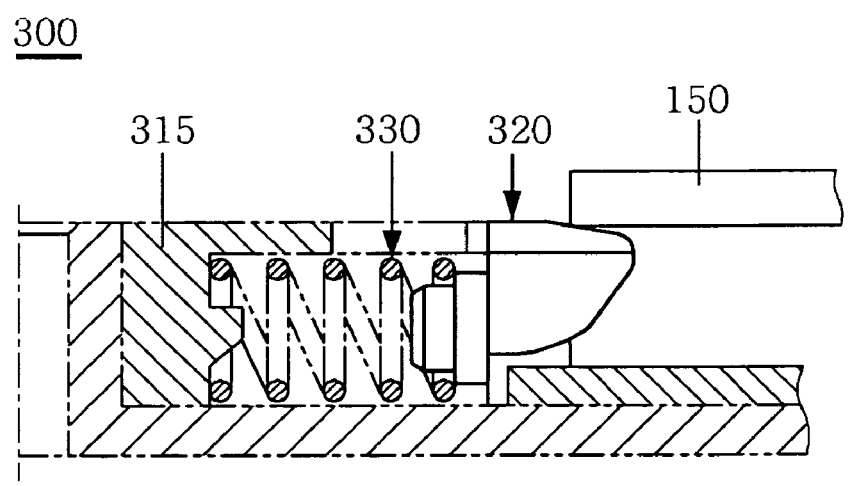
FIGS. 5A to 5C are schematic views showing the state where an optical disk is coupled to the turntable assembly of FIG. 4.
Figure 5B:
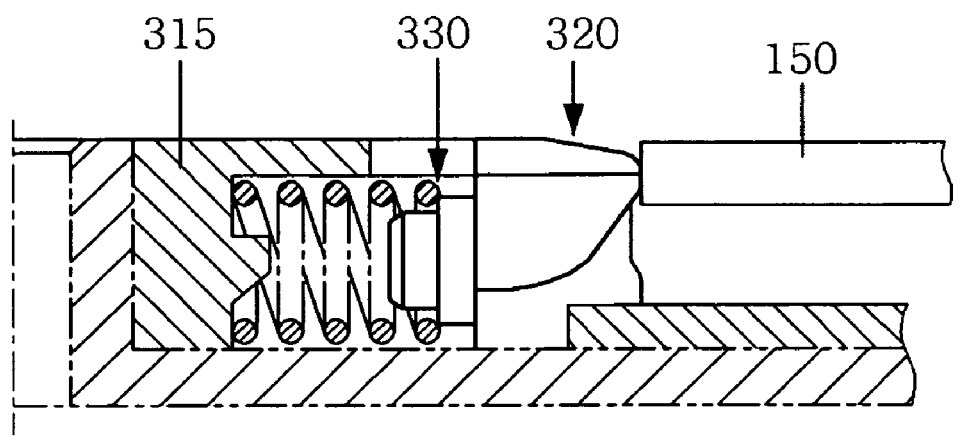
Figure 5C:
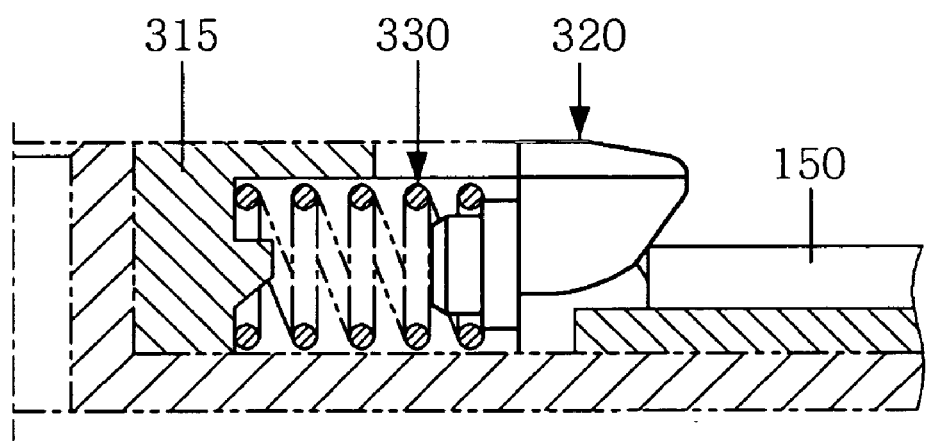

Finally, the optical disk 150 contacts the lower contact surface 122 of each chucking member 120, so that the mounting operation of the optical disk 150 is completed. When each spring 130 is contracted into the housing 115 by the mounting force of the optical disk 150, and the inner circumferential surface of the optical disk 150 passes through the outermost end of each chucking member 120 and engages with the lower contact surface 122, the chucking member 120 must be pushed in a direction opposite the center, that is, in the direction of C. Thereby, the inner circumferential surface of the optical disk 150 firmly engages with the lower contact surface 122 of each chucking member 120 (FIG. 3D).

The above-mentioned turntable assembly 100 has a construction corresponding to one embodiment of the present invention. The present invention is not limited to this embodiment. That is, the external appearance of the chucking member 120 contacting the inner circumferential surface of the optical disk 150 and the elastic support member 140 supporting the chucking member 120, and the construction of the turntable assembly 100, may be freely changed.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

As described above, the present invention provides a turntable assembly, in which an elastic support member supporting a chucking member, which is pushed into a housing when an optical disk is mounted or removed, is bent by a mounting force of the optical disk, thus inclining the chucking member, therefore more efficiently transmitting the mounting force of the optical disk to the chucking member, and allowing the optical disk to be more smoothly mounted.

Further, when the optical disk is mounted/removed, excessive force is not required, and thus the optical disk itself is not damaged.

What is claimed is:

1. A turntable assembly, comprising:
    a holding member to hold an optical disk, the holding member being contracted in a radial direction of the optical disk; and
    a support member to support the holding member in a direction opposite an inserting direction of the optical disk under an inner end of the optical disk, so that at least part of the support member supporting the holding member is elastically deformed in the inserting direction of the optical disk,
    wherein the holding member and the support member are separated.

2. The turntable assembly as set forth in claim 1, further comprising:
    an elastic member to elastically bias the holding member in a direction opposite the radial direction.

3. The turntable assembly as set forth in claim 1, wherein the support member has predetermined displacement in the inserting direction of the optical disk.

4. The turntable assembly as set forth in claim 3, further comprising:
    an elastic member to elastically bias the holding member in a direction opposite the radial direction.

5. A turntable assembly, comprising:
    a chucking member to hold an optical disk, the chucking member being contracted toward a center of the optical disk;
    a spring to elastically bias the chucking member in a direction away from the center of the optical disk;
    an elastic support member to support the chucking member in a direction opposite an inserting direction of the optical disk under an inner end of the optical disk, so that at least part of the elastic support member supporting the chucking member is elastically deformed in the inserting direction of the optical disk; and
    a housing to accommodate the chucking member, the spring, and the elastic support member therein,
    wherein the chucking member and the elastic support member are separated.

6. The turntable assembly as set forth in claim 5, wherein a plurality of chucking members and a plurality of springs are installed around a center of the housing at regular intervals.

7. The turntable assembly as set forth in claim 5, further comprising:
  a turntable to mount the optical disk thereon, the housing being installed at a center of the turntable so that the chucking member contacts an inner circumferential surface of the optical disk.

8. The turntable assembly as set forth in claim 7, wherein a plurality of chucking members and a plurality of springs are installed around a center of the housing at regular intervals.

9. The turntable assembly as set forth in claim 7, wherein the elastic support member comprises:
  a mounting part mounted to be secured to the turntable; and
  a support part to support the chucking member, the support part being spaced apart from the turntable to undergo elastic deformation in the inserting direction.

10. The turntable assembly as set forth in claim 9, wherein a plurality of chucking members and a plurality of springs are installed around a center of the housing at regular intervals.

11. The turntable assembly as set forth in claim 9, wherein a surface of the support part contacting the chucking member is inclined relative to a lower portion of the chucking member at an angle of 17 degrees.

12. The turntable assembly as set forth in claim 11, wherein a plurality of chucking members and a plurality of springs are installed around a center of the housing at regular intervals.

13. The turntable assembly as set forth in claim 11, wherein the chucking member is inclined in the inserting direction due to the elastic deformation of the support part when the optical disk is inserted.

14. The turntable assembly as set forth in claim 13, wherein a plurality of chucking members and a plurality of springs are installed around a center of the housing at regular intervals.

* * * * *